(12) United States Patent
McLane et al.

(10) Patent No.: US 9,212,751 B2
(45) Date of Patent: Dec. 15, 2015

(54) VALVE SYSTEM AND METHOD

(71) Applicants: Allan R. McLane, Powell, OH (US);
Jermaine Ealy, Aurora, IL (US)

(72) Inventors: Allan R. McLane, Powell, OH (US);
Jermaine Ealy, Aurora, IL (US)

(73) Assignee: Robertshaw Controls Company,
Richmond, VA (US)

( * ) Notice: Subject to any disclaimer, the term of this patent is extended or adjusted under 35 U.S.C. 154(b) by 553 days.

(21) Appl. No.: 13/631,105

(22) Filed: Sep. 28, 2012

(65) Prior Publication Data

US 2014/0090414 A1    Apr. 3, 2014

(51) Int. Cl.
| | | |
|---|---|---|
| F25B 1/10 | (2006.01) | |
| F16K 11/085 | (2006.01) | |
| F16K 5/04 | (2006.01) | |
| F25D 17/02 | (2006.01) | |

(52) U.S. Cl.
CPC ........... *F16K 11/0853* (2013.01); *F16K 5/0471* (2013.01); *F25D 17/02* (2013.01); *Y10T 137/86839* (2015.04)

(58) Field of Classification Search
CPC .... F16K 11/0853; F16K 5/0471; F25D 17/02
USPC ................. 137/625.43; 62/510, 115
See application file for complete search history.

(56) References Cited

U.S. PATENT DOCUMENTS

| | | |
|---|---|---|
| 2,868,176 A | 1/1959 | Bennett |
| 3,643,698 A | 2/1972 | Smith |
| 3,949,965 A | 4/1976 | Sharples et al. |
| 4,015,479 A | 4/1977 | Apple |
| 4,268,291 A * | 5/1981 | Cann ................................ 62/117 |
| 5,687,764 A | 11/1997 | Tanaka et al. |
| 7,131,460 B2 | 11/2006 | McLane et al. |
| 7,984,730 B2 | 7/2011 | Ziv et al. |
| 2002/0005221 A1 | 1/2002 | Sisk et al. |
| 2007/0267588 A1 | 11/2007 | McLane et al. |

FOREIGN PATENT DOCUMENTS

| | | |
|---|---|---|
| CN | 2212695 Y | 11/1995 |
| CN | 200958632 Y | 10/2007 |
| EP | 0 240 059 A1 | 10/1987 |

(Continued)

OTHER PUBLICATIONS

International Patent Application No. PCT/US2013/061894, Search Report (Dec. 19, 2013).

*Primary Examiner* — Craig Schneider
*Assistant Examiner* — Kevin Barss
(74) *Attorney, Agent, or Firm* — Leydig, Voit & Mayer, Ltd.

(57) ABSTRACT

A flow control valve includes a housing forming internal passages in fluid communication with a port of the valve, and an internal cavity. A flow direction block is disposed in the internal cavity and forms at least one flow passage extending through a portion thereof. The flow direction block is moveable within the internal cavity such that the free ends of the least one flow passage can be selectively aligned with a respective internal passage along an interface as the flow direction block is moved from a first, closed position to a second, open position. A seal is disposed around each interface and includes an internal face, which presses against an outer surface of the flow direction block, and an external face, which presses against the housing. Sealing function is improved, at least in part, by a differential fluid pressure that acts on the seal.

18 Claims, 4 Drawing Sheets

(56) References Cited

FOREIGN PATENT DOCUMENTS

| | | | |
|---|---|---|---|
| FR | 2 733 566 | A1 | 10/1996 |
| JP | 61-38274 | A | 2/1986 |
| JP | 7-224955 | A | 8/1995 |
| JP | 11-082769 | A | 3/1999 |
| KR | 20-0322085 | Y1 | 7/2003 |

* cited by examiner

VALVE SYSTEM AND METHOD

FIELD OF THE INVENTION

This invention generally relates to flow control valves and, more particularly, to a seal for use in a flow control valve used, for example, in cooling systems.

BACKGROUND OF THE INVENTION

A valve such as a barrel valve is a flow control device used to manage a flow of fluid through a section of pipe. The typical barrel valve includes, among other things, a hollow barrel-shaped housing and a rotatable shaft having a channel passing therethrough. An upper portion of the rotatable shaft is coupled to an actuator.

To open the valve, the actuator moves the rotatable shaft until the channel is aligned with an inlet and an outlet in the housing. In this orientation, the valve permits the fluid to flow freely through the valve. To close the valve, the actuator moves the rotatable shaft until the channel is misaligned with respect to the inlet and outlet in the housing such that the rotatable shaft impedes flow between the inlet and outlet ports of the housing. To meter fluid flow through the valve, the actuator moves the rotatable shaft until the channel is partially aligned with the inlet and outlet in the housing. With the valve generally positioned somewhere between the fully open and closed positions, the valve partially permits or meters the fluid flowing through the valve.

To ensure that leakage of the fluid is reduced or, preferably, eliminated when the barrel valve is at or in between the open and closed positions, the barrel valve generally includes one or more seals. In a conventional barrel valve, at least one of these seals is interposed between mating members of the housing, between the housing and the rotatable shaft, and the like to ensure that the fluid does not undesirably escape from the valve.

To promote a good seal, the seal must maintain contact with adjacent structures which, in this case, are the housing and the rotatable shaft. The contact requirement is often accomplished using a variety of different biasing devices and methods. For example, supplemental springs are often coupled to or incorporated in the seal to provide a tensile force. The tensile force expands or elongates the seal such that opposing ends of the seal are biased against the housing and rotatable shaft. Alternatively, clamps are wrapped around the seal and used to provide a compressive force. Like the tensile force, the compressive force also expands or elongates the seal such that opposing ends are pushed against the housing and the rotatable shaft. By forcibly biasing the ends toward mating structures, the sealing relationship is formed, the integrity of the seal is maintained, and leakage is prevented.

Unfortunately, the use of springs and clamps to maintain a seal between adjacent structures has significant drawbacks. For example, typical springs and clamps are constructed of metal. Because metal is relatively expensive compared to polymers and other typical valve construction materials, the springs and clamps add to the overall cost of the valve. Metals can also corrode when exposed to various fluids. This leads to the need for frequent inspections and, potentially, the costly and time-consuming replacement of the metal parts.

In addition to being costly and subject to premature failure, the springs and clamps all too often require that additional steps be undertaken during assembly of the valve. For example, the spring has to be attached to the seal and the clamp must be wrapped around the seal. These manufacturing steps add to the overall cost of the valve. Moreover, the assembly equipment required to construct a valve that includes springs and clamps must be more advanced or sophisticated to handle the extra component. In addition, during operation, in some cases the springs and clamps undesirably elevate operating torque. Therefore, a larger and more costly actuator must be used to move the rotatable shaft and operate the valve.

In other flow control valves, o-rings are situated between the adjacent structures. The o-rings rely on an interference fit between the housing and rotatable shaft to prevent leakage. By forcing the o-rings into the space between adjacent structures, the o-rings are generally held in compression. The compressive force causes the o-ring to push outwardly toward the adjacent structure and, as a result, the o-ring promotes a tight seal.

Like the springs and clamps, the o-rings also have significant drawbacks. For example, the o-rings rely upon an interference fit to prevent leakage. The interference fit places high compressive loads on the seal. These high compressive loads make the seal more prone to failure. Moreover, if tolerances of the o-ring or adjacent structure are off, the seal may undesirably permit leakage.

BRIEF SUMMARY OF THE DISCLOSURE

In one aspect, the present disclosure describes a flow control valve that includes a housing forming two or more internal passages and an internal cavity in fluid communication with each of the two or more internal passages. Each of the two or more passages is in fluid communication with a respective inlet or outlet port. A flow direction block is disposed in the internal cavity. The flow direction block forms at least one flow passage extending through a portion of the flow direction block. The flow direction block is moveable within the internal cavity such that each of the free ends of the at least one flow passage can selectively be brought into alignment with a respective one of the two or more internal passages along a respective interface as the flow direction block is moved from a first, closed position to a second, open position within the internal cavity. A seal is disposed around each interface and configured to seal against fluid leakage at the interface. The seal includes an internal face, which presses against an outer surface of the flow direction block to form a seal, and an external face, which presses against an inner portion of the housing to form a seal. The pressing against the outer portion of the flow direction block and the inner portion of the housing depends at least in part on a differential fluid pressure that acts on internal and external surfaces of the seal.

In another aspect, the disclosure describes a cooling system that includes first and second cooling circuits. Each cooling circuit has a fluid reservoir and a pump operating to circulate coolant through the respective first and second cooling circuits. The first and second cooling circuits can be selectively disposed in series or parallel circuit flow relation based on a position of a valve system. The valve system includes at least four ports, two of which are connected in series with the first cooling circuit and the remaining two are connected in series with the second cooling circuit. The valve system includes a housing forming four internal passages and an internal cavity in fluid communication with each of the four internal passages. Each of the four internal passages is in fluid communication with a respective one of the four ports. A flow direction block is disposed in the internal cavity. The flow direction block forms two flow passages, each extending through a portion of the flow direction block and being separate from the other. The flow direction block is moveable within the internal cavity such that each of the free ends of each of the two flow passages is selectively alignable with a respective one of the four internal passages along a respective interface when the flow direction block is moved from a first, closed position to a second, open position within the internal cavity. A seal is disposed around each interface and configured to seal against fluid leakage at the interface. The seal includes an internal face, which presses against an outer surface of the flow direction block to form a seal, and an external face, which presses against an inner portion of the housing to form a seal. The pressing against the outer portion of the flow direction block and the inner portion of the housing depends, at least in part, on a differential fluid pressure that acts on internal and external surfaces of the seal and, at least in part, on a mechanical resiliency of the seal.

In yet another aspect, the disclosure describes a method for controlling the flow of a fluid through first, second, third and fourth ports of a valve system such that first and second circuits for fluid are connected in series or in parallel circuit connection. Each of the first, second, third and fourth ports is selectably adjustable to operate as an inlet or an outlet of the valve system. The first port is connected to a source side of a first fluid circuit, the second port is connected to a sink side of the first cooling circuit, the third port is connected to a source side of a second cooling circuit, and the fourth port is connected to a sink side of the second fluid circuit. The method includes providing in internal cavity formed in a housing of the valve system. The internal cavity is fluidly communicable with each of the first, second, third and fourth ports. A flow direction block is displaceably supported within the internal cavity. The flow direction block forms flow passages therewithin that extend through the flow control block between openings that are fluidly connectable with the two first, second, third and fourth ports, such that each flow passage fluidly interconnects two of the first, second, third and fourth ports and is fluidly isolated from a remaining two of the first, second, third and fourth ports. The flow direction block is selectively displaced to a first position to place the first and second circuits in parallel circuit connection by fluidly connecting the first and second ports to one another and the third and fourth ports with one another, and is selectively displaced to a second position to place the first and second circuits in series circuit connection by fluidly connecting the first and fourth ports to one another and the second and third ports to one another.

DETAILED DESCRIPTION OF A PREFERRED EMBODIMENT

Figure 1:
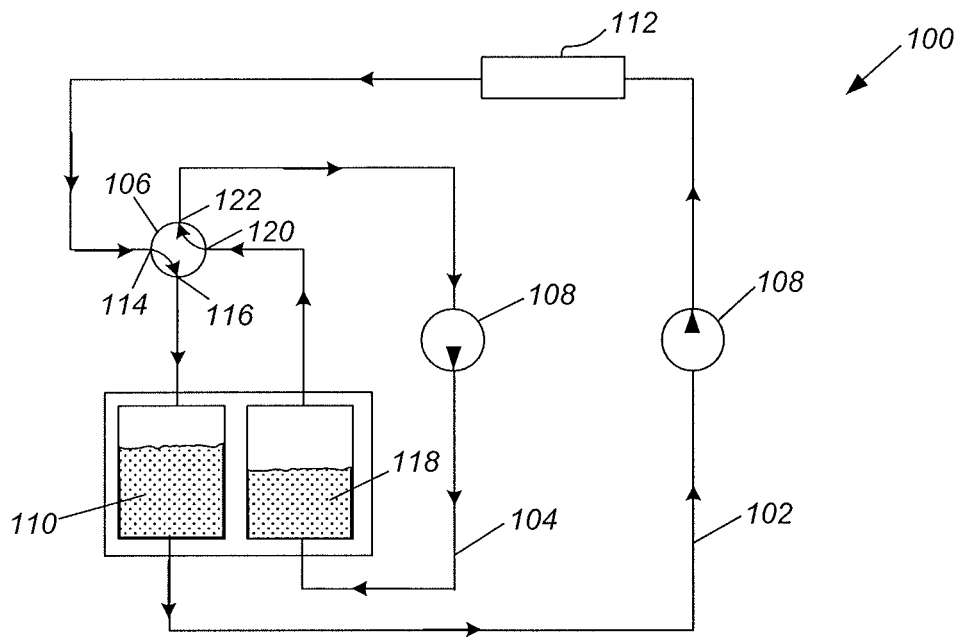
FIG. 1 is a diagram of a cooling system in a first operating state in accordance with the disclosure.
Figure 2:
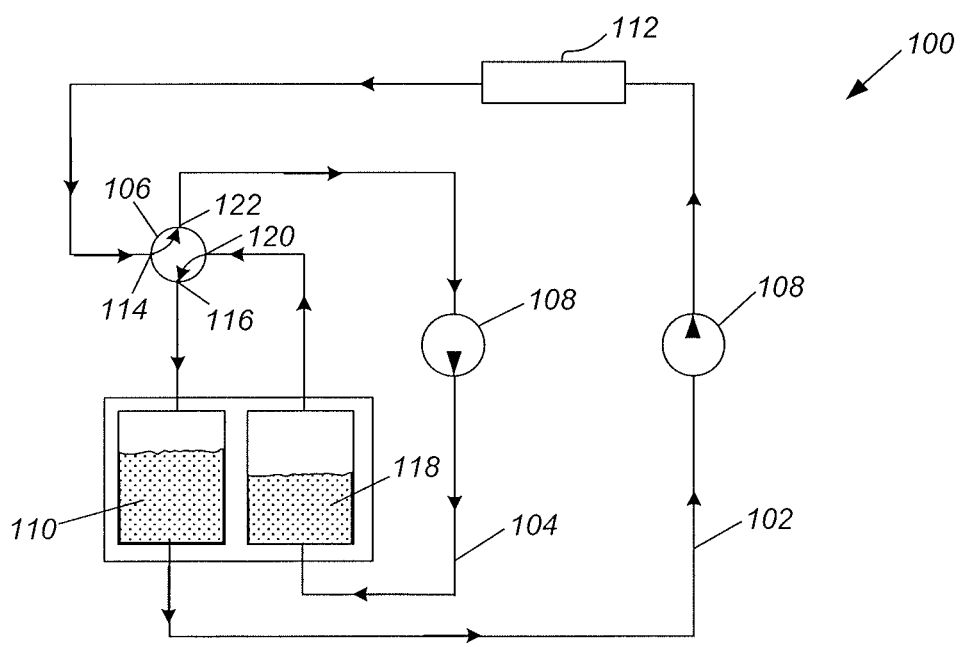
FIG. 2 is a diagram of the cooling system shown in FIG. 1 but in a second operating state.

FIG. 1 is a block diagram of a cooling system 100, which is presented as one exemplary application for an embodiment of a flow control valve in accordance with the disclosure. The cooling system 100 includes first and second cooling circuits 102 and 104, which can be connected in series or parallel circuit connection with one another, for example, through a 4-way valve 106 as shown in FIGS. 1 and 2. In alternative embodiments, the series/parallel connection between the two circuits 102 and 104 can be accomplished through two or more different valve types such as 3-way or 2-way valves. A first or parallel circuit-connection operating state between the first and second cooling circuits 102 and 104 is shown in FIG. 1, and a second or series circuit-connection operating state between the first and second cooling circuits 102 and 104 is shown in FIG. 2. The change between the first and second operating states is determined by the position of the 4-way valve 106. Thus, when the 4-way valve 106 is in a first position, as shown in FIG. 1, the circuits 102 and 104 are in parallel connection, which changes to a series connection when the 4-way valve assumes a second position, as shown in FIG. 2.

More specifically, each cooling circuit 102 or 104 includes a pump 108 configured to circulate cooling fluid therethrough during operation. The first circuit 102 includes a first reservoir 110 for cooling fluid, and may further include a radiator 112 or other device configured to remove heat from the cooling fluid. During operation, fluid circulates through the first circuit 102 by force of the pump 108 from the reservoir 110, through the pump 108 and through first and second ports 114 and 116 of the 4-way valve 106 before returning to the reservoir 110. As shown, the first port 114 is connected to a source side of the first circuit 102, and the second port 116 is connected to a sink side of the first circuit 102. Along its flow path through the first circuit 102, the fluid may pass through and convectively cool other components and systems of a vehicle (not shown), and may optionally further pass through the radiator 112, if present, to expel heat removed from the various components and systems to the environment.

Similarly, the second cooling circuit 104 includes a second reservoir 118 for cooling fluid, which is disposed in heat transfer relationship with the first reservoir 110 in the embodiment illustrated. During operation, fluid circulates through the second circuit 104 by force of the pump 108 from the reservoir 118, through the pump 108 and through third and fourth ports 120 and 122 of the 4-way valve 106 before returning to the reservoir 118. As shown, the third port 120 is connected to a source side of the second circuit 104, and the fourth port 122 is connected to a sink side of the second circuit 104. As in the first cooling circuit 102, the fluid circulating through the second cooling circuit 104 may pass through and convectively cool other components and systems of a vehicle (not shown).

The cooling system 100 can have various applications in systems having two groups of systems or components having different heat loadings during operation. In one example, application of the cooling system 100 is contemplated in an electric drive vehicle where powertrain and power storage systems may be associated with the first and second cooling circuits 102 and 104 respectively, but the cooling system 100 or similar multi-circuit cooling systems can be used in other applications. Depending on the operating condition of the various components and systems that are associated with the cooling system 100, additional cooling may be required for certain components. In such conditions, an adjustment of the operation of the cooling system 100 can be accomplished by selectively placing the first and second cooling circuits 102 and 104 in series or in parallel circuit connection with one another. Such selective placement can be accomplished by appropriate positioning of the 4-way valve 106, which can be responsive to manual, electrical, mechanical, or other switching means between the two positions thereof illustrated in FIGS. 1 and 2.

Figure 3:
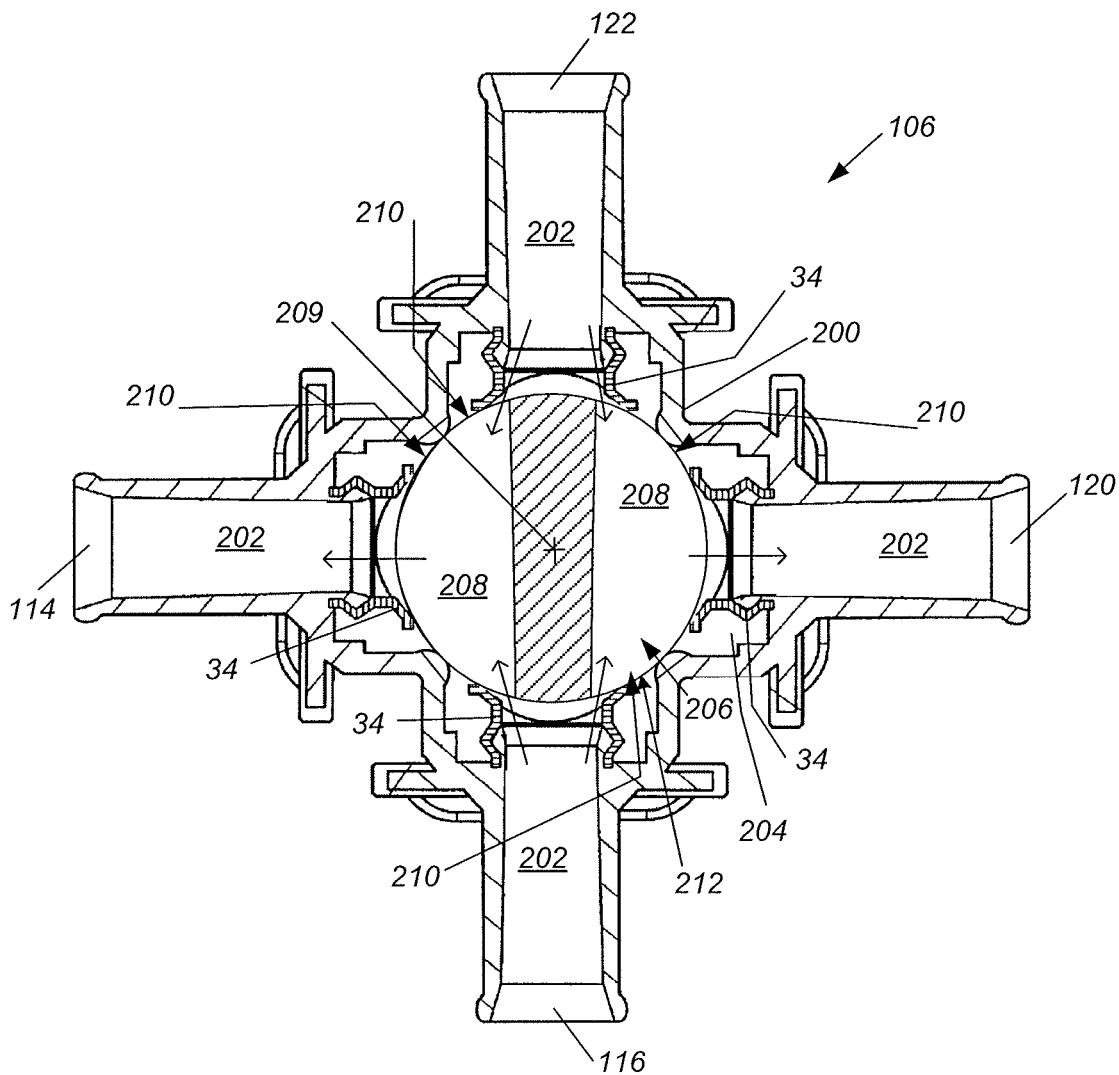
FIG. 3 is a cross section of a valve in accordance with the disclosure.

A cross section of the 4-way valve 106 is shown in FIG. 3. In this figure and in the various other figures that follow, elements or features of the 4-way valve 106 that are the same or similar in the various embodiments described are denoted in the description and drawings using the same reference numerals for simplicity. Accordingly, as shown in the cross section of FIG. 3, the 4-way valve 106 includes first, second, third and fourth ports 114, 116, 120 and 122. Depending on the operating condition of the valve 106, each of the first, second, third or fourth ports 114, 116, 120 and 122 may operate as a fluid inlet or outlet relative to the valve 106. These ports are formed as fluid passages in a valve housing 200, which may be made of a metal or plastic material. The housing 200 forms four internal passages 202, each of which is fluidly connected to a respective port 114, 116, 120 and 122. A generally centrally located internal cavity 204 is formed in the housing 200 and, although not shown in FIG. 3, surrounds all the components disposed therein.

Figure 4:
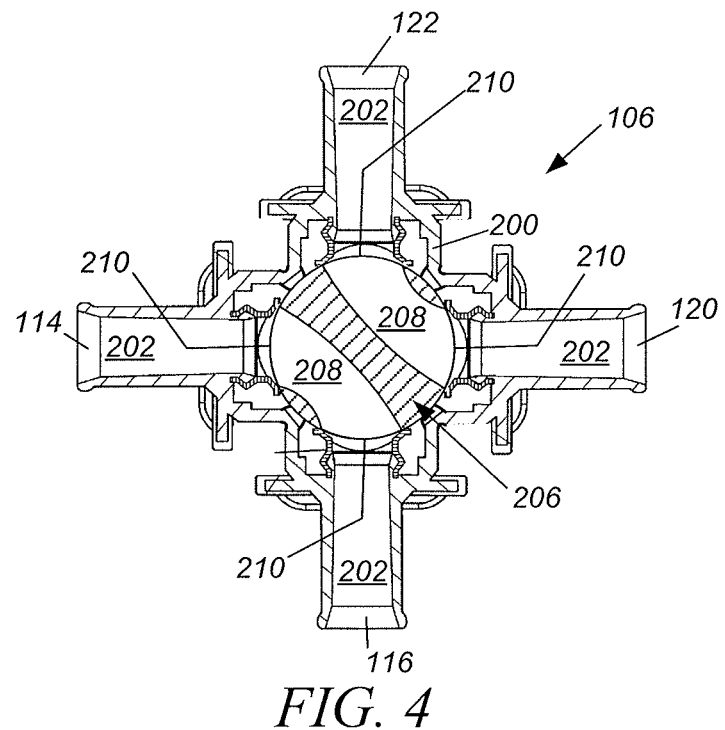
FIGS. 4 and 5 are cross sections of the valve of FIG. 3 shown in two different operating positions.

The internal cavity 204 rotatably supports therewithin and substantially fluidly surrounds a flow direction block 206. In the illustrated embodiment, the flow direction block 206 has a generally cylindrical shape (shown as a circle in the cross section of FIG. 3) having a centerline 209 about which the block 206 can rotate within the housing 200. Although not readily visible in the cross section of FIG. 3, the block 206 has a height along the centerline 209, which centerline extends into and out from the page in the perspective shown in FIG. 3. In the position shown in FIG. 3, the block 206 is rotated to a closed position. The flow direction block 206 forms two curved fluid passages 208 that extend through portions of the block 206. As shown, each fluid passage 208 has a generally circular or elliptical cross section and forms two open ends 210. In the illustrated embodiment, each of the two open ends 210 of each passage 208 is disposed at 90 degrees relative to the other with respect to the centerline 209 of the block and at 90 degrees relative to the open end 210 of the adjacent passage 208. In this way, at two predetermined angular positions of the flow direction block 206 within the housing 200, which are illustrated in FIGS. 4 and 5, each open end 210 is in aligned relation with a respective internal passage 202 and thus with a respective one of the first, second, third and fourth ports 114, 116, 120 and 122.

During operation, depending on the position of the block 206, two of the four ports 114, 116, 120 and 122 are fluidly connected to one another in pairs, through a respective fluid passage 208 of the block 206, while being fluidly isolated from the remaining two ports. In other words, each port 114, 116, 120 and 122 is in fluid communication with one other port and fluidly isolated from the remaining two ports. In the position of the block 206 within the housing 200 as shown in FIG. 4, for example, the first port 114 is fluidly connected to the second port 116 through one of the passages 208, and is fluidly isolated from the third and fourth ports 120 and 122. Similarly, the third and fourth ports 120 and 122 are fluidly connected through the other passage 208 and are fluidly isolated form the first and second ports 114 and 116.

Figure 5:
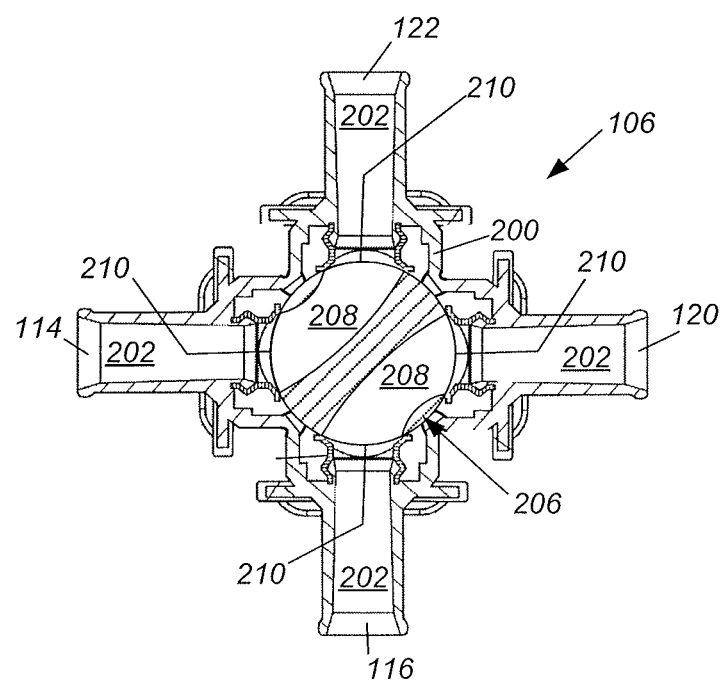

In the position of the block 206 within the housing 200 shown in FIG. 5, the first and fourth ports 114 and 122 are connected to one another while being isolated from the second and third ports 116 and 120. Similarly, the second and third ports 116 and 120 are connected to one another while being isolated from the first and fourth ports 114 and 122. Sealing relative to the fluid connections and fluid isolations within the valve 106 is enhanced by differential pressures acting on the various interfaces.

This differential pressure results from pressure differences between the ports of the valve acting as inlets and those ports acting as outlets when the valve 106 is operating in different configurations. For example, in the valve operating condition shown in FIG. 4, which corresponds to the valve position used in the configuration of the cooling system 100 shown in FIG. 1, the first and third ports 114 and 120 of the valve 106 act as fluid inlets, while the second and fourth ports 116 and 122 act as outlets. Similarly, in the valve operating condition shown in FIG. 5, which corresponds to the valve position used in the configuration of the cooling system 100 shown in FIG. 2, the first and third ports 114 and 120 act as inlets, and the second and fourth ports 116 and 122 act as outlets. Unlike their application in shutoff valves where one seal effectively prevents leakage out of the valve, the seals in the four-port valve keep flow from leaking across channels. Flow would be compelled to move from one channel to the other in the event fluid pressure in one channel was higher than the other. In the illustrated embodiment, however, a pressure difference between the two channels would also be applied against the corresponding seals, this increasing their sealing effectiveness, as previously described, regardless of which of the two channels is at a higher pressure.

The fluid connection between each open end 210 of the passages 208 in the block 206 with the respective internal passage 202, and thus the respective port 114, 116, 120 and 122, is accomplished by a respective seal 34. The respective seals 34 prevent flow from entering into either of the passages 208. In the cross section shown in FIG. 3, the internal cavity extends around the outer portion of each seal such that fluid communication is provided in all areas within the internal cavity 204 of the housing around the seals 34 and the block 206. In the illustrated embodiment, each port 114, 116, 120 and 122 is associated with a respective seal 34.

Figure 7:
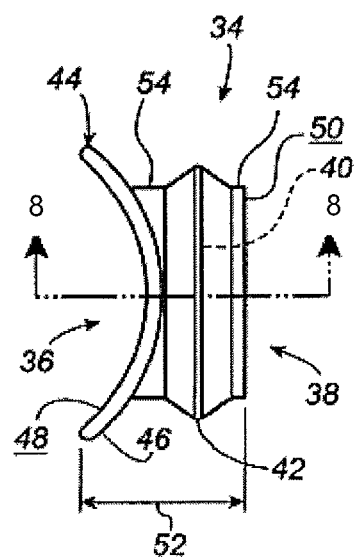
Figure 8:
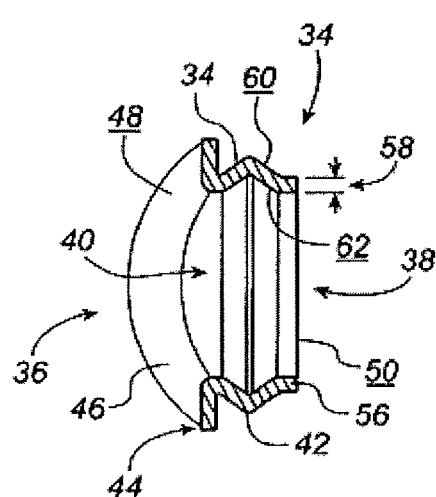
FIG. 8 is a cross section of a seal in accordance with the disclosure.

The seals 34 are connected to the housing 200 and are configured to slidably engage an outer surface 212 of the block 206. The seal 34 is shown from two different perspectives in FIGS. 6 and 7. A cross section of the seal 34 is shown in FIG. 8. In reference to these figures, the seal 34 is formed from an elastomeric material, a natural rubber, or another like substance. For illustration, the seal 34 employed in the illustrated embodiment of FIG. 3 has been extracted from the valve 106. Depending on the direction of flow of fluid through the seal, the seal 34 includes two inlet or outlet openings 36 and 38, a channel 40, and a convolution 42. For simplicity, the opening 36 disposed in contact with the block 206 will be referred to as an internal opening 36, indicating its internal orientation relative the housing 200, and the second opening 38 will be referred to as an external opening 38. The channel 40 shown in FIG. 8 generally extends between the internal and external openings 36 and 38 and provides fluid communication through the seal 34. The channel 40 progresses generally axially through the seal 34. The two openings 36 and 38 and the convolution 42 are integrally formed with each other within an overall seal body 44.

As previously mentioned, the internal opening 36 is configured to sealingly mate with the flow control block 206 (FIG. 3). In that regard, the internal opening 36 includes a radially outwardly projecting inlet flange 46 that defines an inlet surface 48. To further encourage direct contact between the block 206 (best seen in FIG. 3) and the internal opening 36, and to promote a sealing arrangement therebetween, the internal opening 36 has a generally contoured shape to match the contour of the flow control block 206. In the illustrated embodiment, the internal opening 36 is saddle-shaped or parabolic to mate with the cylindrical block 206. As those skilled in the art will recognize from the foregoing description, other shapes corresponding to differently configured flow control blocks 206, e.g., hemispherical to mate with a ball-shaped valve member, are within the scope of the disclosure.

Figure 6:
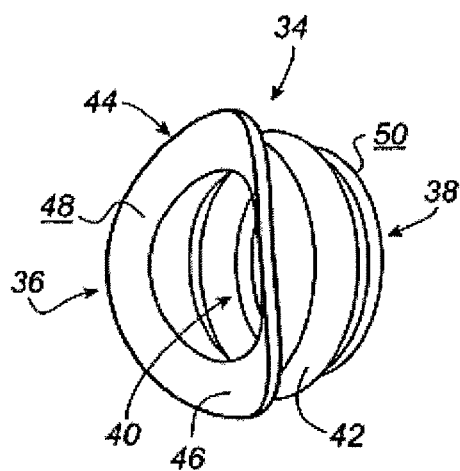
FIGS. 6 and 7 are outline views of a seal in accordance with the disclosure from different perspectives.

As illustrated in FIG. 6, the inlet surface 48 has an extensive and ample surface area. As a result, any wear upon the inlet surface 48 is broadly distributed. Even after many cycles of the valve 106, excessive wear at any particular location is inhibited and/or prevented. By discouraging localized wear on the inlet surface 48, leakage is avoided. In conventional valves that employ an o-ring, for instance, the sealing surface is limited and, as a result, wear may leave a flat or worn spot along the periphery of the o-ring seal. This worn spot may ultimately lose contract with the mating part and undesirably permit leakage.

The external opening 38 is configured to sealingly mate with a portion of the housing 200 (e.g., the internal end portion of the housing around each internal passage 202, as shown in FIG. 3). In the illustrated embodiment, and as best shown in FIG. 7, the external opening 38 includes a generally flat and planar outlet surface 50 that can mates with the portion of the housing 200 proximate the end of the respective internal passage 202. Such engagement is configured to occur when the overall length of the seal is taken up and sealing contact from one end of the seal to the other is maintained. In certain embodiments, such contact is not always necessary or required because the inside of the seal 62 at its end near 38 can be constricted around a tapered tube. This taper can be part of the outlet (or inlet) of tube 202 that is arranged to protrude within the housing 200. The angle of the tapered end is selected based on certain combinations of dimensions and tolerances of the seal body so that the seal is restricted from sliding along the taper and the tube and contacting the vertical wall between 50 and the comparable vertical wall of the internal interface of the port. In such embodiments, the inside cylindrical wall of 62 at end 38 provides the sealing. The external opening 38 and outlet surface 50 are able to assume a variety of different configurations in order to mate with the housing 200 and promote a seal therebetween.

As is best shown in FIG. 7, the convolution 42 is interposed between the internal and external openings 36 and 38 within the seal body 44. The convolution 42 is generally a folded or pleated portion of the seal 34 that projects radially outwardly from the channel 40. Although a single convolution 42 is shown, a plurality of convolutions 42 can be incorporated into the seal 34. As illustrated in FIG. 7, the convolution 42 allows a portion of the seal 34 to resemble an accordion or bellows.

The convolution 42 enables the seal 34 to generally axially expand and contract. Whether the seal 34 expands or contracts depends, in part, upon the angle formed between the portions of the seal wall 56 that form the convolution. If the included angle is greater than ninety degrees, as is the case in the illustrated embodiments, the length 52 of the seal 34 will increase if the pressure on the external surface 60 exceeds that upon the internal surface 62. The portions of the seal wall 56 forming the convolution 42 will be biased away from each other. In contrast, if the included angle is less than ninety degrees, the length 52 of the seal 34 will decrease if the pressure on the external surface 60 exceeds that upon the internal surface 62. The portions of the seal wall 56 forming the convolution 42 will be biased toward each other and, in some cases, may engage each other.

In the illustrated embodiment, when the internal and external openings 36 and 38 are drawn closer together and the seal 34 is compressed along its length 52, the convolution 42 projects further radially outwardly to accommodate the linear movement. In contrast, when the internal and external openings 36 and 38 move away from each other and the seal 34 is expanded along its length 52, the convolution 42 falls radially inwardly to accommodate the linear movement. If the seal 34 is expanded enough, the convolution 42 lies flat and/or generally parallel relative to adjacent portions 54 of the seal body 44. As those skilled in the art will recognize, the convolution 42 expands and contracts to permit the seal 34 to correspondingly expand and contract.

As shown in FIG. 8, the seal 34 defines a seal wall 56. The seal wall 56 has a thickness 58, defined by the distance between an external surface 60 and an internal surface 62. The thickness 58 can vary depending on the particular conditions present in each application, for example, the material of the seal 34, the operating pressures expected to be present, the temperature of the fluid conducted through the seal 34, the number of sealing cycles expected to be experienced by the seal 34, and other factors. In the illustrated embodiment, the thickness 58 is generally uniform along the entire seal wall 56, which includes the convolution 42. In alternative embodiments, the thickness 58 of the seal wall 56 within the seal 34 can vary along the length 52 of the seal 34.

In one embodiment, a portion of the seal 34 near the external opening 38 is fitted over a tapered end of housing 200 at an area surrounding an internal end of the respective internal passage 202. As such, the internal surface 62 mates with the tapered end of the housing 200 and maintains an interference fit. This interference fit encourages formation of a seal, even at low pressures. With an increasing differential pressure across the seal 34, the seal contracts radially inwardly against the tapered end of the housing 200. In one embodiment, the seal 34 relies exclusively upon engagement between the internal surface 62 and the housing 200 to form a seal and inhibit or prevent leakage. In such an embodiment, the outlet surface 50 of the seal 34 need not maintain contact with the housing 200.

As those skilled in the art will recognize, the thickness 58 of the seal wall 56 affects the flexibility of the convolution 42, the strength of the seal 34, and the like. The thickness 58 of the seal wall 56 also contributes to the rate at which the seal 34 is able to expand and contract. In general, the thicker the seal wall 56, the slower the seal 34 responds to changing conditions such as, for example, a changing pressure differential across the seal wall 56.

In operation, as previously discussed, the ports 114, 116, 120 and 122 of the valve 106 are coupled to upstream and downstream pipe sections of one or more cooling circuits, for example, first and second cooling circuits 102 and 104 (shown in FIGS. 1 and 2). The pipe sections are configured to transport a fluid such as water, oil, hydraulic fluid, fuel, air and the like. Because the fluid is inclined to flow along the direction of fluid flow denoted by arrows in FIGS. 1 and 2, the fluid will pass through the valve 106. As the block 206 (FIG. 3) is rotated by, for example, an actuator (not shown) between the two previously discussed operating positions to a third position, fluid can pass through clearances in the valve to avoid a dead-heading condition. While the block 206 is in the third, intermediate position, a relatively small amount of fluid will be trapped within the fluid passages 208 of the block 206. In such intermediate orientation, the valve 106 allows flow without causing too severe of a pressure rise, as shown in FIG. 3.

During each of the two operating modes on the flow path with lowest internal pressure, there may be created a pressure differential across the seal wall 56 that causes the flexible convolution 42 to move radially inwardly towards the internal cavity 204 of the housing 200, thus compelling the seal body 44 to expand along its length 52 (FIG. 7). When the seal body 44 expands, the internal end of the seal 34 (around the internal opening 36) is biased against the block 206 by a hydrostatic force resulting from the pressure differential, and the external end of the seal 34 (around external opening 38) is forcibly biased by the same hydrostatic force against the housing 200. Therefore, the inlet surface 48 and the outlet surface 50 are tightly pressed against adjacent structures. This condition will occur for the two seals and the flow passage having the lower pressure of the two flow streams as shown in FIGS. 4 and 5. For the high pressure flow stream, two seals are loaded with higher internal pressure than outside pressure while fluid flows through the valve. When fluid does not flow through the valve, static fluid pressure in the passages will be maintained and prevented from leaking into the passage having a lower pressure by the second set of seals. When the block 206 is rotated by the actuator so that the open ends 210 of the curved flow fluid passages 208 are at least partially aligned with the respective internal passages 202, the 4-way valve 106 is in a partially open or metered flow position. In such an orientation, the fluid passing through each open end 210 is divided and tends to travel along two divergent paths. A first portion of fluid will flow into the respective internal passage 202 and through the respective port 114, 116, 120 or 122, while the second portion of the fluid flow will enter into the internal cavity 204, causing it to become pressurized. In this way, the pressure of the internal cavity will become elevated compared to the pressure within the respective internal passage 202. As a result of the pressurization of fluid within the internal cavity 204, the pressure acting on the external surface 60 of the seal wall 56 will be higher than the pressure acting on the internal surface 62 of the seal 34 and create a pressure differential created across the seal wall 56 that will enhance the sealing function of the seals 34 in preventing leakage from one passage 208 to the other.

In the partially open position, while the pressure differential is not as great as when the valve 106 is in the fully closed position, there still exists a pressure differential across the seal wall 56. The somewhat diminished pressure differential, in combination with a mechanical resilience of the seal material, still cause the flexible convolution 42 to move somewhat radially inwardly into the channel 40 and compels the seal body 44 to expand somewhat along its length 52 (FIG. 7). As before, the expanding seal body 44 biases the internal opening 36 against the block 206 and biases the external opening 38 against the housing 200. Despite the reduced hydraulic pressure forces in this condition, the inlet surface 48 and the outlet surface 50 are nonetheless pressed against adjacent structures. This action promotes a seal between components proximate the seal 34 yet permits the block 206 to be rotated without considerable difficulty and/or hardship. The lack of any leakage or any significant leakage through the seal 34 coupled with the ability of the block 206 to rotate within the housing 200 without distress facilitates good response times and reliability of the valve.

When the block 206 is moved from a partially aligned position such that less of the fluid flows to the internal cavity 204 and more of the fluid flows to the respective internal passage 202, the pressure differential across the seal wall 34 decreases. The diminished pressure differential permits the convolution 42 to move radially outwardly, thus reducing a biasing force acting on the block 206 and urging the seal body 44 to contract. Even so, the internal opening 36 is still biased against the block and the external opening 38 is still biased against the housing 200. Despite the weaker pressure differential, the inlet surface 48 and the outlet surface 50 are nonetheless pressed against the adjacent structures.

If the block 206 is rotated by the actuator such that the open ends 210 are fully axially aligned with their respective port 114, 116, 120 and 122, the flow of fluid is permitted to flow freely through the valve 106, as previously described. In such a case, the valve 106 is in a fully opened position and the pressure differential across the seal wall 56 will depend on the static fluid pressure difference between the two passages 208. Even such pressure differential from one stream to the other, the inlet surface 48 is still biased against the block 206 and the outlet surface 50 is still biased against the housing 200 due to the size, flexibility, resiliency, elasticity, and/or other characteristics of the seal 34. In addition, because of the generally smooth, laminar flow of water or another coolant through the valve 106, when used in a cooling system 100 as shown in FIGS. 1 and 2, the stress on the seal 34 is, in many circumstances, minimal.

From the foregoing, those skilled in the art will recognize that the invention provides an elastomeric seal for a flow control valve (e.g., a barrel valve) that provides leak proof sealing, low operating torque (i.e., low friction), and lower cost compared to when springs, clamps, and/or o-rings are used. The seal performs these tasks by utilizing one or more convolutions to expand or contract the seal due to a pressure differential across a seal wall. As the pressure differential increases, the seal increasingly expands due to the convolution and promotes the formation of a sealing arrangement between adjacent parts. This provides superior sealing without requiring high torque to operate the valve, and minimizes wear when compared to seals such as o-rings that rely strictly on an interference fit between components.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF ELEMENTS

No. Description 34 seal
36 internal opening
38 external opening
40 channel
42 convolution
44 seal body
46 inlet flange
48 inlet surface
50 outlet surface
52 length
54 adjacent portions
56 seal wall
58 thickness
60 external surface
62 internal surface
100 cooling system
102 first circuit
104 second circuit
106 valve
108 pump
110 first reservoir
112 radiator
114 first port
116 second port
118 second reservoir
120 third port
122 fourth port
200 housing
202 internal passage
204 internal cavity
206 block
208 fluid passage
209 centerline
210 open ends
212 outer surface

What is claimed is:

1. A flow control valve, comprising:
a housing forming two or more internal passages and an internal cavity in fluid communication with each of the two or more internal passages, wherein each of the two or more passages is in fluid communication with a respective port;
a flow direction block disposed in the internal cavity, the flow direction block forming two flow passages extending through a portion of the flow direction block, wherein the flow direction block is moveable within the internal cavity such that each of the free ends of each of the two flow passages can selectively be brought into alignment with a corresponding one of the two or more internal passages of the housing along a respective interface when the flow direction block is moved;
a seal disposed around each interface and configured to seal against fluid leakage at the interface;
wherein the seal includes an internal face, which presses against an outer surface of the flow direction block to form a seal, and an external face, which presses against an inner portion of the housing to form a seal, the pressing against the outer portion of the flow direction block and the inner portion of the housing depending at least in part on a differential fluid pressure that acts on internal and external surfaces of the seal.

2. The flow control valve of claim 1, wherein the housing forms four ports, and wherein each of the two flow passages has two free ends, such that each of the four free ends corresponds to a respective one of the four ports, wherein each flow passage fluidly interconnects two of the four ports and fluidly isolates the two of the four ports from the remaining two of the four ports.

3. The flow control valve of claim 1, wherein the seal slidably engages the outer surface of the flow direction block and includes two inlet or outlet openings fluidly interconnected by a channel.

4. The flow control valve of claim 3, wherein the seal further includes at least one convolution formed in a seal body along the channel such that, when a pressure differential is applied to the seal body, a length of the seal body increases and thus a hydraulic pressing force applied along a sliding interface between the seal and the outer surface of the flow direction block also increases.

5. The flow control valve of claim 4, wherein the seal further comprises a radially outwardly projecting inlet flange that defines an inlet surface surrounding the internal opening of the seal, the internal opening and inlet flange having a contoured shape that matches a contour of the outer surface of the flow direction block.

6. The flow control valve of claim 4, wherein the seal body has a generally hollow shape defining a seal wall, the seal wall having a uniform thickness along the seal wall.

7. The flow control valve of claim 4, wherein the seal body has a generally hollow shape defining a seal wall, the seal wall having a non-uniform thickness along the seal wall.

8. The flow control valve of claim 3, wherein the external opening of the seal includes a generally flat and planar outlet surface that mates with a portion of the housing of the valve that is proximate an end of a respective internal passage.

9. A cooling system that includes first and second cooling circuits, each cooling circuit having a fluid reservoir and a pump operating to circulate coolant through the respective first and second cooling circuits, the first and second cooling circuits being selectively disposed in series or parallel circuit flow relation based on a position of a valve system, the valve system having at least four ports, two of which being connected in series with the first cooling circuit and a remaining two of which being connected in series with the second cooling circuit, the valve system comprising:
a housing forming four internal passages and an internal cavity in fluid communication with each of the four internal passages, wherein each of the four internal passages is in fluid communication with a respective one of the at least four ports, two of which being configured as inlet ports and the remaining two being configured as outlet ports;
a flow direction block disposed in the internal cavity, the flow direction block forming two flow passages, each extending through a portion of the flow direction block and being separate from the other, wherein the flow direction block is moveable within the internal cavity such that each of the free ends of each of the two flow passages is selectively alignable with a respective one of the four internal passages along a respective interface when the flow direction block is moved from a first position to a second position within the internal cavity;

a seal disposed around each interface and configured to seal against fluid leakage at the interface;

wherein the seal includes an internal face, which presses against an outer surface of the flow direction block to form a seal, and an external face, which presses against an inner portion of the housing to form a seal, the pressing against the outer portion of the flow direction block and the inner portion of the housing depending at least in part on a differential fluid pressure that acts on internal and external surfaces of the seal and at least in part on a mechanical resiliency of the seal; and such that one of the two inlet ports is fluidly connected to one of the two outlet ports when the flow direction block is in the first position and to the other of the two outlet ports when the flow direction block is in the second position.

10. The cooling system of claim 9, wherein the seal slidably engages the outer surface of the flow direction block and includes two inlet or outlet openings fluidly interconnected by a channel.

11. The cooling system of claim 9, wherein the valve system includes four seals.

12. The cooling system of claim 10, wherein the seal further includes at least one convolution formed in a seal body along the channel such that, when a pressure differential is applied to the seal body, a length of the seal body increases and thus a hydraulic pressing force applied along a sliding interface between the seal and the outer surface of the flow direction block also increases.

13. The cooling system of claim 12, wherein the seal further comprises a radially outwardly projecting inlet flange that defines an inlet surface surrounding the internal opening of the seal, the internal opening and inlet flange having a contoured shape that matches a contour of the outer surface of the flow direction block.

14. The cooling system of claim 12, wherein the seal body has a generally hollow shape defining a seal wall, the seal wall having a uniform thickness along the seal wall.

15. The cooling system of claim 12, wherein the seal body has a generally hollow shape defining a seal wall, the seal wall having a non-uniform thickness along the seal wall.

16. The cooling system of claim 10, wherein the external opening of the seal includes a generally flat and planar outlet surface that mates with a portion of the housing that is proximate an end of a respective internal passage.

17. A method of controlling the flow of a fluid through first, second, third and fourth ports of a valve system such that first and second circuits for fluid are connected in series or in parallel circuit connection, each of the first, second, third and fourth ports being selectably adjustable to operate as an inlet or an outlet of the valve system, the first port being connected to a source side of a first fluid circuit, the second port being connected to a sink side of the first cooling circuit, the third port being connected to a source side of a second cooling circuit, and the fourth port being connected to a sink side of the second fluid circuit, the method comprising:

providing an internal cavity formed in a housing of the valve system, the internal cavity being fluidly communicable with each of the first, second, third and fourth ports;

displaceably supporting a flow direction block within the internal cavity, the flow direction block forming flow passages therewithin that extend through the flow control block between openings that are fluidly connectable with the two first, second, third and fourth ports, such that each flow passage fluidly interconnects two of the first, second, third and fourth ports and is fluidly isolated from a remaining two of the first, second, third and fourth ports;

selectively displacing the flow direction block to a first position to place the first and second circuits in parallel circuit connection by fluidly connecting the first and second ports to one another and the third and fourth ports with one another;

selectively displacing the flow direction block to a second position to place the first and second circuits in series circuit connection by fluidly connecting the first and fourth ports to one another and the second and third ports to one another; and further comprising providing a resilient seal between each of the first, second, third and fourth ports with the flow control block, each resilient seal having an internal opening in sliding sealing relation with an outer surface of the flow control block and an external opening in static sealing relation with an inner portion of the housing, wherein each resilient seal forms a channel through which fluid can pass and wherein the source side of at least the first circuit is at a higher pressure than the source side of the second circuit such that a pressure differential is applied to at least one resilient seal.

18. The method of claim 17, further comprising improving a sealing function of each resilient seal by providing at least one convolution in a seal wall of the resilient seal onto which the pressure differential is applied to increase a hydraulic pressing force along a sliding interface between the resilient seal and the outer surface of the flow control block.

* * * * *